5189X
J. Mackay,
Piano Action,
Patented Aug. 14, 1828.
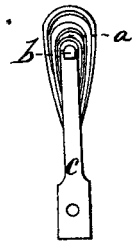
AM. PHOTO-LITHO. CO. N.Y. (OSBORNE'S PROCESS.

UNITED STATES PATENT OFFICE
PTO – BOYERS, PA DUTY STATION

---

PAGE NOT AVAILABLE

PATENT NUMBER X5189 FOR THE ISSUE DATE 8/14/1828 HAS BEEN SCANNED/LOADED, BUT WITH MISSING PAGE(S). UPON RECEIPT OF THE MISSING PAGE(S), THE ENTIRE DOCUMENT WILL BE RESCANNED. THIS NOTICE IS FOR THE MISSING PAGE CONTAINING:

Missing ALL TEXT

DATA CONVERSION OPERATION
BOYERS, PA